United States Patent [19]
Crane

[11] 3,784,928
[45] Jan. 8, 1974

[54] GAS DISCHARGE DEVICE AND ELECTRODE FOR USE THEREIN

[75] Inventor: Robert Anthony Crane, Lachine, Quebec, Canada

[73] Assignee: RCA Limited, Montreal, Quebec, Canada

[22] Filed: June 4, 1971

[21] Appl. No.: 149,915

[52] U.S. Cl.............. 331/94.5, 313/217, 313/218
[51] Int. Cl. ....................... H01s 3/02, H01s 3/22
[58] Field of Search................. 331/94.5; 313/217, 313/218; 23/2; 252/460

[56] References Cited
OTHER PUBLICATIONS

Paananen, IEEE Spectrum, June 1966, pp. 88-99 (Note p. 96 Especially).
Witteman, IEEE J. Quantum Electronics, Vol. QE-2, No. 9, Sept. 1966, pp. 375-378. QC 447I7.
Carbone, IEEE J. Quantum Electronics, Vol. QE-4, No. 3, March, 1968, pp. 102-103. QC 447I7.
"Platinum" 23 page Brochure by Int'l. Nickel Co., 1968, pp. 1-19 Avail. Sci. Library. TN 799.P7 I5.

Primary Examiner—Ronald L. Wibert
Assistant Examiner—R. J. Webster
Attorney—Glenn H. Bruestle, George G. Seligsohn and Irwin M. Krittman

[57] ABSTRACT

A carbon dioxide laser having a dense ceramic casing of high thermal conductivity which is non-reactive with the gas mixture. The anode and cathode electrodes of the laser comprise a rhodium-platinum alloy, which exhibits a low sputtering rate and which is also non-reactive with the gas mixture. The resulting device exhibits a lifetime of 8,000 hours or more under sealed conditions.

11 Claims, 1 Drawing Figure

PATENTED JAN 8 1974
3,784,928
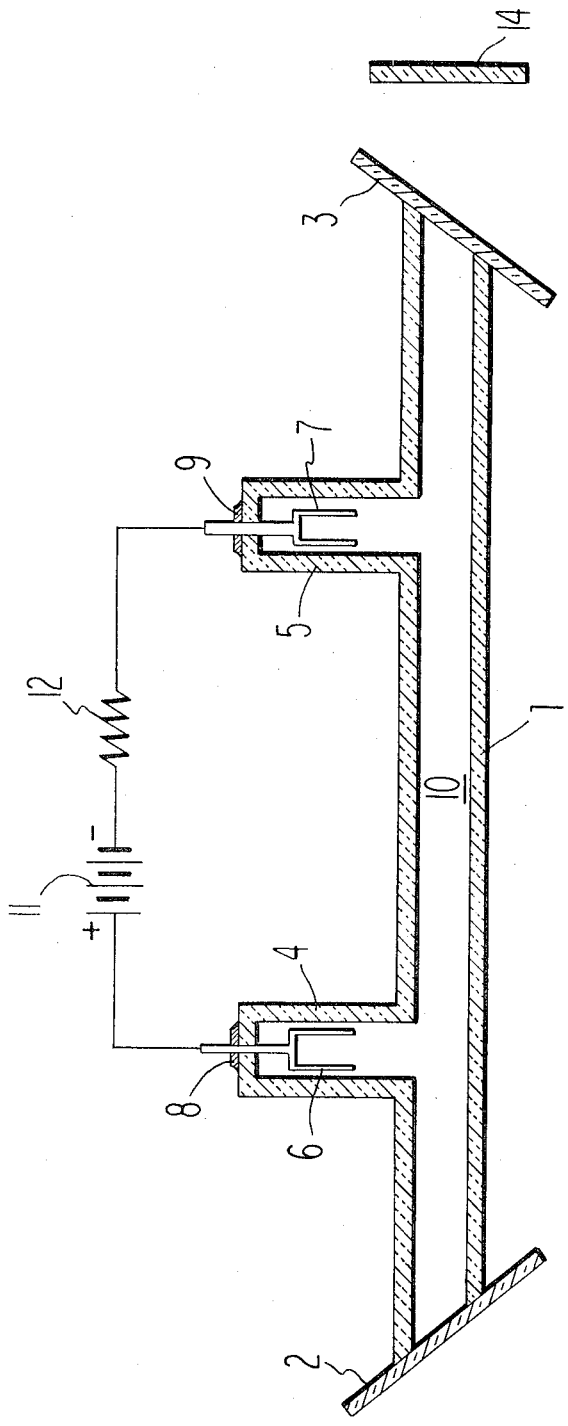
INVENTOR
*Robert A. Crane.*
BY
*Arthur L. Lessh*
ATTORNEY

GAS DISCHARGE DEVICE AND ELECTRODE FOR USE THEREIN

This invention relates to an electrode for use in a gas discharge device, and is particularly applicable to electrodes for gas lasers.

In many applications, it is desirable to operate a gas laser under sealed conditions, i.e. where the gas is completely sealed within the laser envelope, so that it cannot be replenished. In order to operate in this manner with a long tube life, it is essential that the interior surfaces of the laser envelope, and the electrodes within the envelope, be substantially non-reactive with the gas mixture. Any chemical interaction between the gas mixture and the adjacent portions of the laser structure results in removal of gas constituents from the mixture, thus changing the composition of the mixture and reducing operating efficiency, power output and tube life.

For example, the carbon dioxide laser, which usually employs a mixture of carbon dioxide, nitrogen and helium as the operating gas mixture, generates an infrared output at 10.6 microns, a wavelength at which atmospheric attenuation is especially low. In addition, the carbon dioxide laser is capable of high output power levels at conversion efficiencies of 20 percent or more.

The aforementioned features render the carbon dioxide laser especially suitable for high quality, wide bandwidth communication systems. While the possibility of maintenance and replacement of ground-based carbon dioxide lasers renders the lifetime requirements of such lasers relatively non-critical (lifetimes on the order of 1,000 hours being acceptable for general purpose use), carbon dioxide lasers which are to be installed in spacecraft and employed in satellite communication systems must have lifetimes comparable to those of the useful life of the satellite in which they are installed. Therefore, there is a need for a carbon dioxide laser which is capable of operating for extended periods of time under sealed conditions.

In order to maintain the efficiency of a carbon dioxide laser near its optimum value, it is necessary to keep the temperature of the tube envelope below about 40°C. Since the spacecraft environment imposes severe limitations upon the cooling mechanisms which can be employed and the thermal gradients which can be maintained, it is essential that the tube envelope have a high thermal conductivity. However, the glass envelope which is conventionally employed for lasers does not exhibit as high a thermal conductivity as one would wish. In addition, it is difficult to treat such glass envelopes to remove sufficient impurities therefrom for successful operation under sealed conditions without heating the envelope to temperatures at which the glass softens.

An additional problem in the manufacture of sealed carbon dioxide lasers (and other gas lasers employing constituents other than noble gases) is that of chemical interaction between the gas mixture and the laser anode and cathode electrodes, (the cathode electrode being affected to a considerably greater degree than the anode electrode) which must of course be made of conductive material.

For example, nickel is commonly used as a cathode electrode material for carbon dioxide lasers. Under operating conditions, the carbon dioxide and nitrogen in the gaseous plasma dissociate and interact with each other, so that the resulting gas mixture, in its plasma state, contains decomposition products of these gases, such as carbon monoxide (CO), oxygen ($O_2$), nitrous oxide ($N_2O$) and nitric oxide (NO). These decomposition products act as oxidizing agents which react with the nickel electrode to form a coating of nickel oxide (NiO) thereon. As a result, oxygen is removed from the gas mixture, changing the composition thereof and reducing the efficiency, power output and operating life of the laser.

At higher temperatures, on the order of 300° to 500°C, the nickel oxide coating is thermally reduced, and the oxygen contained therein is released to the surrounding gas. It is therefore, desirable to maintain the nickel cathode electrode at a relatively high temperature. In some carbon dioxide laser designs, this is accomplished by arranging the electrode structure so that it is heated to the desired temperature by ion bombardment from the surrounding gas.

However, in most cases it is difficult to maintain such an arrangement at desired levels of stability, so that external heating of the cathode electrode must be provided. In a spacecraft environment such external heating requirements consume additional power.

Another electrode material which has been employed in prior art carbon dioxide lasers is platinum. This material does not react with the oxidizing agents present in the gas mixture.

However, when it is attempted to employ platinum as the cathode electrode material in a carbon dioxide laser having appreciable power output, ion bombardment of the cathode electrode results in a high rate of sputtering of the electrode material. The resulting sputtering removes platinum from the cathode and deposits it on the laser windows and/or mirrors, with consequent reduction of conversion efficiency and loss of output power. In addition, heavy conductive platinum deposits on the laser tube bore adjacent to the cathode cause the plasma discharge to wander, causing unstable and noisy operation of the laser.

The best lifetime reported in the literature for carbon dioxide lasers employing nickel or platinum cathode electrodes is in the order of 4,300 hours for platinum electrodes and 9,000 hours for externally heated nickel cathode electrodes.

Thus, the use of nickel electrodes requires a self-heating or external heating system, which causes considerable complication in the laser design and reduces overall maintainability and reliability, while the use of platinum results in excessive sputtering which reduces operating efficiency, power output and tube life.

As herein described, there is provided an electrode for use in a gas discharge device, wherein the electrode comprises rhodium, iridium, rhenium, ruthenium or osmium.

There is also described herein a gas discharge device which has an envelope comprising a high purity ceramic material of high thermal conductivity and low helium porosity. Means are provided, including anode and cathode electrodes, for exciting the gas to a plasma state. The ceramic material is selected to be substantially non-reactive with the gas and with decomposition products thereof present in the plasma.

The drawing shows a carbon dioxide laser in accordance with a preferred embodiment of the invention.

The laser shown in the drawing comprises a tubular ceramic body portion 1 having Brewster angle windows 2 and 3 at oposite ends thereof.

Coupled to the tubular ceramic body portion 1 are ceramic anode and cathode electrode housings 4 and 5 respectively, the housings being secured to the body portion by means of a high temperature glass frit (not shown).

Situated within each of the electrode housings are generally cylindrical anode and cathode electrodes 6 and 7, respectively. Each of the electrodes 6 and 7 terminates in a rod-like portion which extends through an aperture at the end of the corresponding housing. The upper portion of each housing is metallized, and end caps 8 and 9 are brazed to the metallized housing ends and to the rods extending therethrough.

An excitable gas mixture 10 comprising carbon dioxide is sealed within the laser envelope.

Operating voltage for exciting the gas mixture 10 to its plasma state is provided by a d.c. voltage source 11 and a current limiting resistor 12.

An optical resonant cavity which includes therein at least a portion of the gas mixture 10 is formed by the end mirrors 13 and 14, which may be partially or totally reflective.

The ceramic body portion 1 and the ceramic electrode housings 4 and 5 must have interior surfaces of high purity which do not contain constituents reducible in an oxidizing atmosphere. That is, the interior walls of the ceramic envelope must be substantially non-reactive with the gas mixture 10 and with any decomposition products thereof that may be present in the gaseous plasma which is formed when the gas is excited by the voltage source 11 via anode and cathode electrodes 6 and 7 respectively.

Since helium, which has very low viscosity, is a major ingredient of the gas mixture 10, it is essential that the ceramic material of which the envelope is formed be relatively dense and exhibit a low helium porosity, preferably on the order of $10^{-12}$ std cc/sec/cm$^2$ or less.

A suitable ceramic material which exhibits the required density, is mechanically strong, thermally conductive and capable of being made substantially non-reactive with any oxidizing constituents of the gas mixture, is alumina ($Al_2O_3$).

Other ceramic materials which may be employed are: beryllia (BeO), thallia ($ThO_2$), zirconia ($ZrO_2$), lithium aluminum silicate ($LiAlSiO_4$), silicon carbide (SiC), boron carbide ($B_4C$), calcium fluoride ($CaF_2$), and magnesium fluoride ($MgF_2$).

In manufacturing the ceramic envelope, the body portion 1 is secured to the housings 4 and 5 by means of a high temperature glass frit. Thereafter, the ceramic envelope is heated in air at a temperature on the order of 1,200°C for a time on the order of 60 minutes, in order to oxidize any trace impurities present in the ceramic material. Care should be taken to minimize the quantities of oxidizable detrimental ingredients in the frit material, such as calcium, lead and magnesium. We have found that the resulting alumina ceramic does not react with the gaseous components of the carbon dioxide laser plasma.

Additional advantages of alumina as the envelope material are the ease with which it can be mass produced in a variety of configurations, its high thermal conductivity, its high mechanical strength (which enables the laser to withstand the mechanical stresses inherent in the launching of spacecraft), and its compatibility with metallization techniques for providing ceramic-to-metal high temperature seals, as well as its compatibility with high temperature glass frit seals for forming ceramic-to-ceramic and ceramic-to-metal joints.

Since the carbon dioxide, nitrogen and helium present in the laser gas mixture, as well as the carbon monoxide, oxygen, nitrous oxide and nitric oxide decomposition products present in the gaseous plasma do not interact with the adjacent walls of the ceramic laser envelope, the gas is maintained in a condition in which reversible reactions take place between the gas constituents, thus maintaining the composition of the gas mixture in dynamic equilibrium, so that the gas composition does not vary substantially with time, and useful tube life is greatly extended.

The high thermal conductivity of the ceramic material enables efficient cooling of the laser to maintain the envelope walls at the desired temperature. However, this high thermal conductivity also results in the cooling of electrodes 6 and 7, so that it is very difficult to employ nickel which is self-heated or externally heated, as the electrode material.

We have found that the use of a rhodium-platinum alloy as a material for the anode and cathode electrodes 6 and 7 results in a tube life of 8,000 hours or more. Rhodium acts electrically as a satisfactory cathode material, since its work function (4.8 electron volts) is only slightly greater than that of nickel (4.6 electron volts). Moreover, rhodium does not react with the oxidizing atmosphere of the gas 10 in its plasma state, and exhibits low vapor pressure and a low sputtering rate. Extended tube life has been verified with an alloy comprising 10 percent rhodium and 90 percent platinum, by weight. However, electrodes including 1–100 percent rhodium, by weight, may also be employed.

Instead of rhodium, chemically similar metals, such as iridium, rhenium and ruthenium may be employed, either in their pure form or alloyed with one another, or with platinum. Also, osmium may be employed if it is alloyed with one of the aforementioned materials. Osmium cannot be employed in its pure state, since in its pure form it reacts with the oxidizing atmosphere present in the gas plasma.

In our preferred embodiment, the ceramic envelope (comprising body portion 1 and electrode housings 4 and 5) is made of a high density alumina ceramic as previously mentioned, the envelope having been pretreated in the manner described. The electrodes consist of an alloy comprising (by weight) 10 percent rhodium and 90 percent platinum, the Brewster angle windows 2 and 3 comprise germanium or galium arsenide, and the gas mixture 10 comprises, by volume, on the order of 14 percent carbon dioxide, 22 percent nitrogen, 64 percent helium and either (i) xenon to a partial pressure of 1 to 2 torr or (ii) water vapor to a partial pressure of 0.1 to 0.7 torr, the total gas pressure being on the order of 20 torr. The laser is preferably operated at a tube wall temperature on the order of 40°C or less.

The aforementioned electrode compositions are not limited to use in ceramic tube envelopes, but provide greatly improved performance when employed, e.g. in glass tube envelopes as well.

What is claimed is:

1. A gas discharge device for use in a carbon dioxide laser, wherein said device is of the type comprising an envelope, spaced anode and cathode electrodes within said envelope, and an excitable gas mixture including carbon dioxide sealed within said envelope which is operative when in an optical resonant cavity as an active lasing medium in response to a pumping discharge between said electrodes through said gas mixture; the improvement therein in which at least said cathode electrode comprises material means for reducing the sputtering rate of material therefrom below the sputtering rate of a pure platinum cathode electrode, said material means being selected from the group consisting of rhodium, iridium, rhenium, ruthenium and osmium.

2. The gas discharge device defined in claim 1, wherein said gas mixture comprises, by volume, on the order or 14 percent carbon dioxide, 22 percent nitrogen, 64 percent helium, and either (i) xenon to a partial pressure of 1 to 2 torr or (ii) water vapor to a partial pressure of 0.1 to 0.7 torr, the total gas pressure being on the order of 20 torr.

3. The gas discharge device defined in claim 1, wherein said cathode electrode comprises a platinum-rhodium alloy containing at least 1 percent rhodium by weight.

4. The gas discharge device defined in claim 3, wherein said alloy contains 10 percent rhodium by weight.

5. The gas discharge device defined in claim 4, wherein said cathode electrode is generally cylindrical.

6. The gas discharge device defined in claim 1, wherein said envelope comprises a thermally conductive ceramic material having a porosity to helium in the order of $10^{-12}$ std/cc/cm$^2$ or less, said ceramic material being substantially non-reactive with said gas mixture and with decomposition products thereof.

7. The gas discharge device defined in claim 4, wherein said ceramic material comprises alumina, thallia, beryllia, zirconia, lithium aluminum silicate, silicon carbide, boron carbide, calcium fluoride or magnesium fluoride.

8. The gas discharge device defined in claim 7, wherein said gas mixture comprises, by volume, on the order of 14 percent carbon dioxide, 22 percent nitrogen, 64 percent helium, and either (i) xenon to a partial pressure of 1 to 2 torr or (ii) water vapor to a partial pressure of 0.1 to 0.7 torr, the total gas pressure being on the order of 20 torr.

9. The gas discharge device defined in claim 7, wherein said cathode electrode comprises a platinum-rhodium alloy containing at least 1 percent rhodium by weight.

10. The gas discharge device defined in claim 9, wherein said alloy contains 10 percent rhodium by weight.

11. The gas discharge device defined in claim 10, wherein said cathode electrode is generally cylindrical.

* * * * *

UNITED STATES PATENT OFFICE
CERTIFICATE OF CORRECTION

Patent No. 3,784,928          Dated January 8, 1974

Inventor(s)   Robert Anthony Crane

It is certified that error appears in the above-identified patent and that said Letters Patent are hereby corrected as shown below:

Claim 7, column 6, line 8, "4" should read --6--.

Signed and sealed this 11th day of June 1974.

(SEAL)
Attest:

EDWARD M. FLETCHER, JR.
Attesting Officer

C. MARSHALL DANN
Commissioner of Patents